Oct. 21, 1924.  
C. W. CADE  
TRUCK  
Filed June 2, 1920  
1,512,454
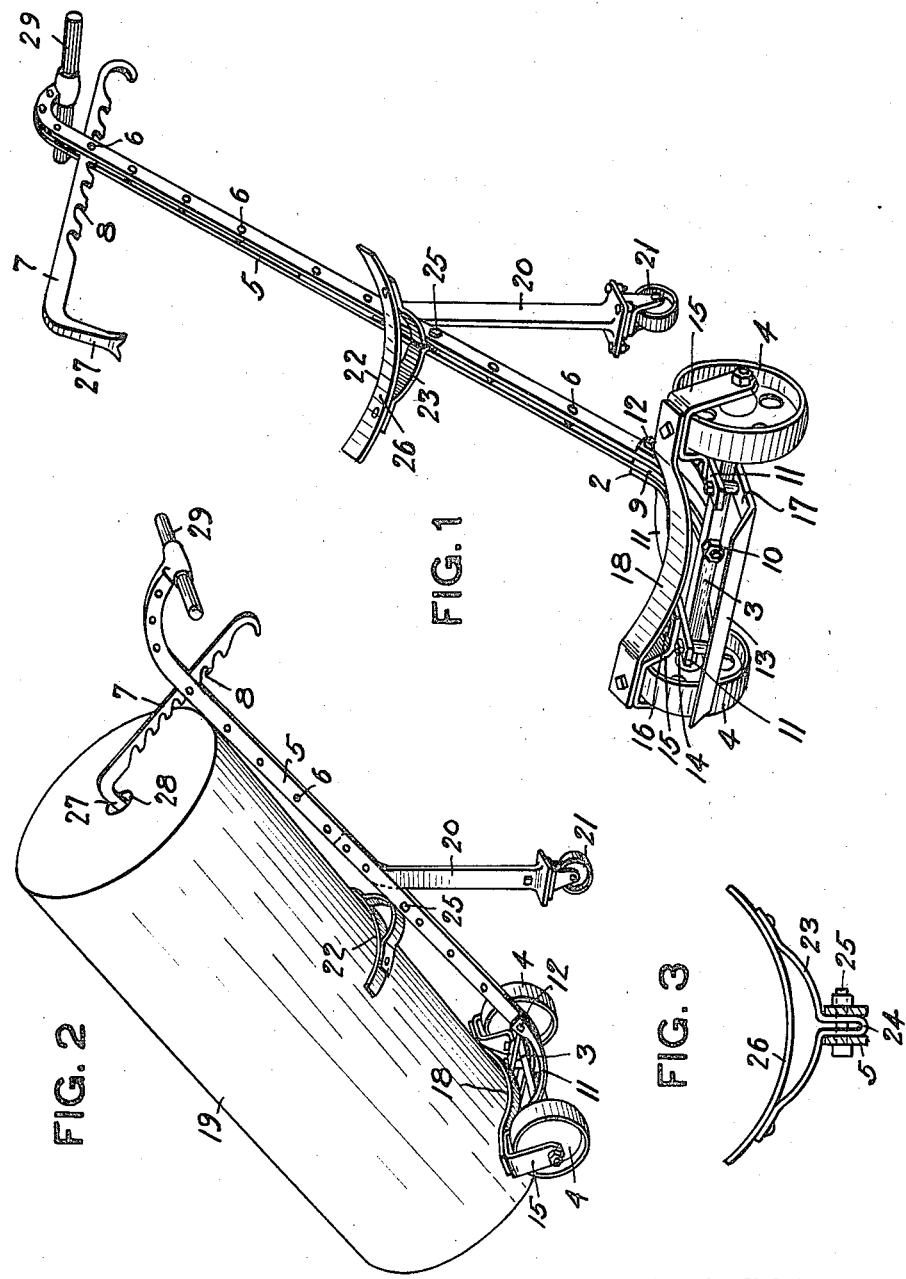
INVENTOR  
Charles W. Cade Patented Oct. 21, 1924.

1,512,454

UNITED STATES PATENT OFFICE.

CHARLES W. CADE, OF BELLEVUE, PENNSYLVANIA, ASSIGNOR TO McKINNEY MANUFACTURING COMPANY, OF PITTSBURGH, PENNSYLVANIA, A CORPORATION OF PENNSYLVANIA.

TRUCK.

Application filed June 2, 1920. Serial No. 386,082.

*To all whom it may concern:*

Be it known that I, CHARLES W. CADE, a citizen of the United States, and resident of Bellevue, in the county of Allegheny and State of Pennsylvania, have invented a new and useful Improvement in Trucks; and I do hereby declare the following to be a full, clear, and exact description thereof.

My invention relates to what are generally termed in the trade "one-man trucks" for handling heavy articles such as paper-rolls, cotton-bales, etc.

The object of my invention is to provide a truck of this character by which one man can readily mount the paper-roll or other object on the truck and move the same without difficulty from one place to another, the truck being especially adapted for use in paper-mills, press-rooms of newspapers and other large printing organizations, or in ware-rooms and on docks where cotton-bales are to be handled and transferred.

In the accompanying drawing, Fig. 1 is a perspective view of my improved truck; Fig. 2 is a like view showing the paper roll in position thereon for transportation; and Fig. 3 is a detail.

In the drawing, the numeral 2 designates the truck proper which consists of the axle 3 upon which the wheels 4 are loosely mounted.

The shaft 5 is made up of two bars which are connected by the pins 6 with the ends riveted, said pins being arranged at suitable intervals apart, and said pins acting as spacers for the bars composing the shaft and also as supports for the grappling-hook 7 provided with the teeth 8 adapted to engage said pins.

Secured to the lower end of the shaft 5 is the center-brace 9 which extends through an opening in the axle 3, a nut 10 on the end of said brace securing same to said axle. Side-braces 11 are secured to the lower end of the shaft 5 by the same bolt 12 which secures the center-brace 9 in position. These side-braces project beyond the axle, and the toe-piece 13 is secured to the ends of said side-braces by the bolts 14.

Wheel-guards 15 are mounted on the outer ends of the axle, and said wheel-guards pass over the wheels and down the inner side thereof and are connected by bolts 16 to the axle, said bolts also passing through the inwardly projecting straps 17 of the toe-piece.

Secured to the wheel-guards 15 is the concave rest 18 which forms a seat for the lower end of the paper-roll 19 when mounted on the truck.

A supplementary standard or support 20 is provided which is securely held between the bars of the shaft 5, said standard being provided with the wheel 21. This standard rests upon the floor when the roll is being transported and takes care of the weight permitting the heaviest roll to be moved about by one man with great ease. The shaft extends upwardly at an angle of 45°, or approximately such an angle, so that the operator can conveniently push the truck with the three wheels resting on the floor.

A semi-circular rest 22 is mounted on the shaft 5, said rest being preferably constructed as follows:

The metal plate 23 is bowed and the metal of the central portion bent to form the flange 24 which is adapted to enter the space between the bars of the shaft, and a bolt 25 passing through said flanges secures the plate 23 rigidly in position. A curved metal strip 26 is riveted to the plate 23, the ends of said strip extending beyond the ends of the plate 23 to form a rest for the roll. In this manner, I provide a very strong rest or support for the roll which will not work loose and which will hold the roll firmly in position against wabbling or displacement.

The grappling-hook 7 is of the common construction with the downwardly projecting hook 27 adapted to enter the central opening 28 in the roll.

The outer end of the shaft 5 is provided with the customary handle 29.

In the handling of a paper-roll, the operator moves the truck up to the roll, which is standing on end, and by bringing the shaft 5 up into a substantially vertical position, he adjusts the grappling-hook with its hook 27 inserted in the opening 28 in the roll. In this manner, the roll is firmly and securely held in place on the truck without danger of its slipping therefrom, and the truck may then be moved with great ease and without any considerable exertion on the part of the operator due to the fact that the weight of the roll is largely carried by the supplementary brace or standard 20 with its wheel traveling on the floor.

By having the supports 18 and 22 conforming to the shape of the roll, and without any points or projections, there is nothing to tear or damage the paper, and the grappling-hook entering as it does the pipe which forms the core of the roll, no tearing of the paper due to the contact of the grappling-hook is liable.

My improved truck is well adapted for transferring heavy articles, and while I have illustrated it in connection with a paper-roll, it is apparent that the truck is adaptable for any other use, such as conveying cotton-bales and other ponderous articles in which case the grappling-hook would be modified to suit the shape of the article being handled, the feature of the supplemental brace or standard being one which is applicable where any extremely heavy articles are to be handled.

What I claim is:

1. The combination with a truck provided with wheels, an axle and a shaft, of brace members, one disposed at each side of the shaft, and having one end connected to said shaft and its other end extending across the top of said axle, a toe-piece having rearwardly extending projections disposed beneath said axle and in alignment with the forward ends of said braces, and means for securing said toe-piece to said braces at points forwardly and rearwardly of said axle.

2. In a truck, the combination of an axle, wheels mounted thereon, a toe-piece connected to said axle, a shaft connected to said axle formed of spaced bars, a semi-circular rest on said shaft comprising a bowed member with a flange bent thereon entering the space between said bars, securing means for holding said bowed member in place, and a semi-circular strip secured to said bowed member extending beyond the ends thereof.

In testimony whereof, I, the said CHARLES W. CADE, have hereunto set my hand.

CHARLES W. CADE.

Witnesses:
 ROBT. D. TOTTEN,
 JOHN F. WILL.